(12) United States Patent
Tordy

(10) Patent No.: US 9,856,119 B2
(45) Date of Patent: Jan. 2, 2018

(54) MEASURING JIB LENGTH OF A CRANE

(71) Applicant: HIRSCHMANN AUTOMATION AND CONTROL GMBH, Neckartenzlingen (DE)

(72) Inventor: Robert Tordy, Hassloch (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 476 days.

(21) Appl. No.: 14/386,824

(22) PCT Filed: May 6, 2013

(86) PCT No.: PCT/EP2013/059381
§ 371 (c)(1),
(2) Date: Oct. 6, 2014

(87) PCT Pub. No.: WO2013/174642
PCT Pub. Date: Nov. 28, 2013

(65) Prior Publication Data
US 2015/0077283 A1    Mar. 19, 2015

(30) Foreign Application Priority Data

May 23, 2012 (DE) .................. 10 2012 208 635

(51) Int. Cl.
*G01S 13/84* (2006.01)
*B66C 13/46* (2006.01)
*B66C 23/90* (2006.01)
*G01B 21/02* (2006.01)

(52) U.S. Cl.
CPC ............ *B66C 13/46* (2013.01); *B66C 23/905* (2013.01); *G01B 21/02* (2013.01); *G01S 13/84* (2013.01)

(58) Field of Classification Search
CPC ........ G01B 17/00; G01B 21/02; G01B 21/16; G01C 3/02; G01S 11/14; G01S 13/84; G01S 13/08; G01S 13/36; F15B 15/28; B66C 13/16; B66C 13/46; B66C 15/065; B66C 23/78; B66C 23/90; B66C 23/905
See application file for complete search history.

(56) References Cited

U.S. PATENT DOCUMENTS

| 2,253,975 | A | * | 8/1941 | Guanella | G01S 1/02 324/520 |
| 2,527,753 | A | * | 10/1950 | McConnell | G01S 13/02 235/414 |
| 4,216,868 | A | * | 8/1980 | Geppert | G01D 5/34792 212/278 |

(Continued)

FOREIGN PATENT DOCUMENTS

| DE | 102009055763 A | 5/2011 |
| JP | 2001019364 B | 1/2001 |
| WO | 2010003636 A | 1/2010 |

*Primary Examiner* — Peter M Bythrow
(74) *Attorney, Agent, or Firm* — Daniel Rose; Foley & Lardner LLP

(57) ABSTRACT

Method for determining the overall length (GL) of a jib (1, 4) of a crane in a wear-free manner, characterized in that a signal is coupled in at a first point (2, 5) of the jib (1, 4) and is coupled out at a second point (3, 6) of the jib (1, 4), the overall length (GL) being determined from the time required for the signal to go from the first point (2, 5) to the second point (3, 6).

6 Claims, 1 Drawing Sheet

(56) References Cited

U.S. PATENT DOCUMENTS

| | | | | |
|---|---|---|---|---|
| 4,385,028 A | * | 5/1983 | Salaman | B66C 13/46 250/237 R |
| 4,516,117 A | * | 5/1985 | Couture | B66C 15/045 212/280 |
| 5,877,693 A | * | 3/1999 | Eyler | B66C 23/905 212/276 |
| 8,181,798 B2 | * | 5/2012 | Moller | B66C 13/16 212/230 |
| 8,473,246 B1 | * | 6/2013 | Thorn | G01N 29/07 324/644 |
| 2005/0258122 A1 | * | 11/2005 | Morath | B66C 13/16 212/294 |
| 2006/0259270 A1 | * | 11/2006 | Shimomura | B66C 23/905 702/173 |
| 2008/0134547 A1 | * | 6/2008 | Kliffken | E02F 9/264 37/347 |
| 2009/0250424 A1 | * | 10/2009 | Moller | B66C 13/16 212/276 |
| 2010/0070179 A1 | * | 3/2010 | Cameron | G01S 5/0027 701/301 |
| 2011/0187548 A1 | * | 8/2011 | Maynard | B66C 15/045 340/685 |
| 2011/0191025 A1 | * | 8/2011 | Maynard | B66C 15/045 701/301 |
| 2011/0199099 A1 | * | 8/2011 | Kato | B66C 13/46 324/642 |
| 2011/0253662 A1 | * | 10/2011 | Stander | B66C 13/14 212/281 |
| 2013/0154869 A1 | * | 6/2013 | Cameron | G01S 13/46 342/54 |

* cited by examiner

MEASURING JIB LENGTH OF A CRANE

CROSS REFERENCE TO RELATED APPLICATIONS

This application is the US-national stage of PCT application PCT/EP2013/059381 filed 6 May 2013 and claiming the priority of German patent application 102012208635.8 itself filed 23 May 2012.

FIELD OF THE INVENTION

The invention relates to a method of wear-free determination of the overall length of a jib of a crane as well as an apparatus for carrying out this method.

BACKGROUND OF THE INVENTION

For the operation of a crane, in particular with regard to safety, it is extraordinarily important to know the overall length of a single-part jib or also the overall length of a telescopic jib. The load at which the jib can be operated is dependent upon both the overall length and also the jib angle and optionally further parameters.

For determination of the length of the jib, in particular in the case of telescopic jibs with a plurality of jib elements, it is already known to determine the current overall length of the jib by the length of a cable that is entrained when the jib is retracted or extended. This cable is wound or unwound on a drum, wherein the number of turns is a measure of the wound or unwound length of cable and thus indirectly is also a measure of the overall length of the jib. Although such cable-guided systems have proved successful in practice, they have the disadvantage that during the service life of the crane they are subject to wear and moreover they involve additional weight. If it is to be possible to determine the jib length with sufficient precision, especially in the case of greater jib lengths, it is necessary to implement additional measures (for example in order to prevent sagging of the cable).

A wear-free method of determination of the overall length of a jib of a crane is already known from DE 10 2006 025 002 [U.S. Pat. No. 8,181,798]. In this connection the jib length is determined by wireless technology, in particular by RFID technology. This system does indeed overcome the disadvantages of the cable-guided system, specifically the precision is improved, the weight is reduced and also wear is eliminated. However, the wireless-based system has the disadvantage that it is not interference-free to safety-critical standards without further additional and thus costly provisions, since extraneous interference signals (for example by mobile wireless, radiotelephony and the like) can interfere with the signal transmission. Thus for the safety-related operation of a crane it is not ensured that the jib length can be determined reliably by such a system.

OBJECT OF THE INVENTION

Therefore the object of the invention is to provide a method of wear-free determination of the overall length of a jib of a crane as well as apparatus for carrying out such a method by which the above-described disadvantages are effectively avoided.

SUMMARY OF THE INVENTION

This object is in that a signal is fed in at a first point on the jib and is detected at a second point on the jib, and the overall length is determined from the time required for the signal to pass from the first point to the second point. This means that elapsed-time measurement is utilized in order to determine the overall length of the jib, in particular a single-part jib or a plurality of jib elements of a telescopic jib. This elapsed-time measurement is largely interference-free and wear-free and significantly reduces the weight. Moreover it is merely necessary to determine the elapsed-time once for a specific type of jib in order then to know the elapsed-time for jibs of the same type, regardless of whether they are single-part jibs or telescopic jibs, and to determine the jib length therefrom during operation after setting up of the crane.

Whereas a telescopic jib is formed of a plurality of jib elements that are movable relative to one another, in an individual jib element the overall length can vary, depending upon which parts are attached to the jib. As a representative example it may be mentioned here that a latticed mast point is attached to a jib, wherein the length of the attached latticed mast element is also relevant for the overall length of the jib. In this respect the term "jib" is also understood to be such a jib that is not only formed as a single part, but can also be assembled from a plurality of parts. Here too the method offers the possibility of determining the overall length as a function of the assembled parts of the jib (setup state). The method is particularly flexible when the complete jib has been assembled from a plurality of parts and then, before the crane is used, an elapsed-time measurement is carried out in order to ascertain the overall length. This ascertained overall length is then included in the further calculation, in particular a load torque calculation. A further advantage of this elapsed-time measurement can be seen in the fact that when the setup state of the crane, in particular the composition of the jib, has been changed during operation of the crane, the new overall length that results can be ascertained and compared with the previously ascertained overall length. In the event of variations this means that the new overall length has changed, which can be included in the further load torque calculation and this new overall length can be taken into account. Therefore it is a further advantage that the method of wear-free determination of the overall length of the jib is repeated not only before the use of the crane, but also during the operating period. In order to increase the operational security of the crane this repetition advantageously takes place every time when the setup state has changed or alternatively and in addition thereto at specific time intervals.

BRIEF DESCRIPTION OF THE DRAWING

Further configurations of the method according to the invention for wear-free determination of the overall length of the jib are set out in the subordinate claims and are explained in greater detail in this connection with reference to the figures in which:

SPECIFIC DESCRIPTION OF THE INVENTION

Figure 1:
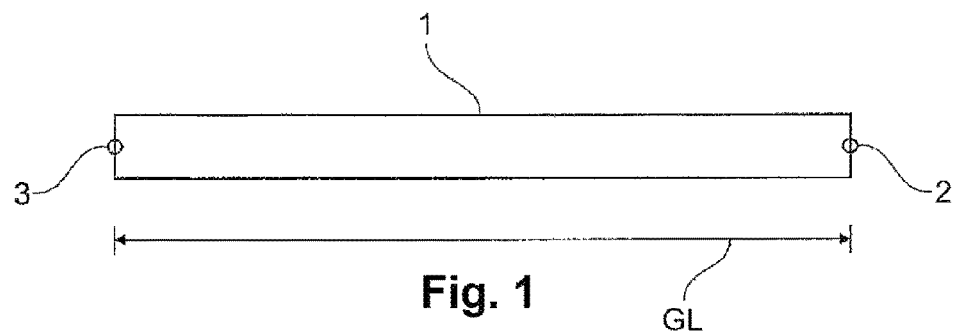
FIG. 1 is a side view of a jib showing the connections points for feeding in and detecting a signal transmitted through the jib.
Figure 2:
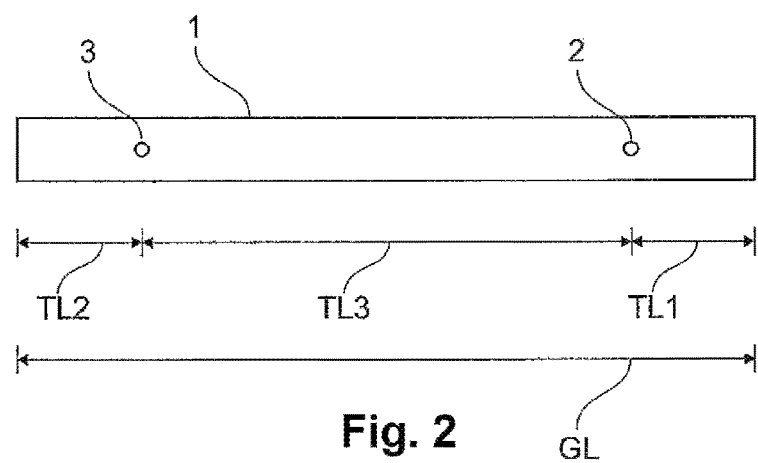
FIG. 2 is a view like FIG. 1 more particularly illustrating the invention.

In FIGS. 1 and 2, in so far as they show this in detail, a jib 1 is illustrated schematically. This jib 1 may be of single-part or multi-part construction FIG. 1 shows that on the ends of the jib 1 a signal is fed in at a first point 2 and detected at a second point 3. The overall length GL of the jib 1 can be determined from the elapsed-time required for the signal to pass from the first point 2 to the second point 3, optionally taking further parameters into account. In this case the overall length L is determined directly from elapsed-time measurement between the points 2 and 3.

An indirect determination of the overall length GL of the jib 1 is illustrated in FIG. 2. This shows in principle that at least one signal is fed in and/or out at a spacing from an end of the jib 1, and in the determination of the overall length GL the spacing between the end and the infeed point 2 is taken into consideration. With regard to FIG. 2 this means that here the two points 2 and 3 are each spaced from the respective end of the jib 1. The spacing between the infeed point 2 and the respective end (the right end of the jib 1 in FIG. 2) is designated by part-length TL1. The spacing between the detection point 3 and the respective end (the left end of the jib 1 in FIG. 2) is designated by part-length TL2. These two part-lengths TL1, TL2 are known on the basis of the geometric arrangement of the infeed and detection points 2 and 3 on the jib 1 and can therefore be taken into consideration in the determination of the overall length GL. A further part-length designated TL3 (part-length 3) is determined by elapsed-time measurement according to the invention between the infeed and detection points 2 and 3 (feeding in at the point 2 and detecting at the point 3 or vice versa). Then by simple calculation the overall length GL can be obtained by addition of the three part-lengths TL1, TL2 and TL3. In this case the part-lengths TL1 and TL2 are constants, whereas the part-length TL3 can vary due to the assembly of the jib 1 from a plurality of parts and therefore must be determined metrologically by elapsed-time measurement. Depending upon the geometric configuration of the jib 1 or the components thereof, the part-length TL1 and/or the part-length TL2 may also be equal to zero. Likewise it is conceivable to determine the overall length of a jib that consists of a plurality of parts, using the method as has been described with regard to FIG. 1 or 2.

Figure 3A:
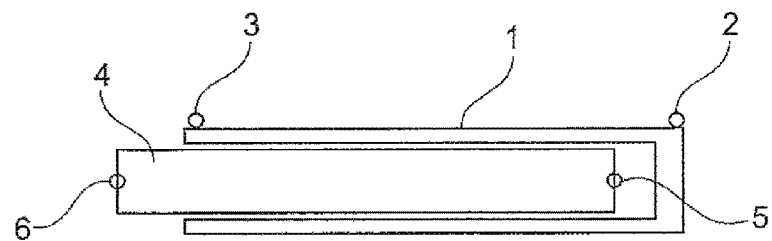
FIGS. 3A and 3B are axial sections through a telescopic two-part jib in retracted and extended positions.

FIGS. 3A and 3B are schematic views illustrating how to carry out the method when the jib is configured as a telescopic jib. In this case the overall length GL is determined from the individual lengths of the jib elements or sections 1 and 4, wherein the two jibs 1 and 4 are movable relative to one another, in particular axially movable. As already described above, the jib section 1 has the infeed and detection points 2 and 3 with the aid of which the overall length GL can be determined by elapsed-time measurement. Likewise the jib section 4 has the infeed points 5 and 6, so that the overall length GL can also be determined. Such a constructive configuration has the advantage that the jib sections 1 and/or 4 do not absolutely have to be of single-part construction, but may be assembled from a plurality of components. If components of different lengths are assembled this results in a respective change in the overall length of the respective jib sections 1 and 4 that can be determined by elapsed-time measurement.

Figure 3:
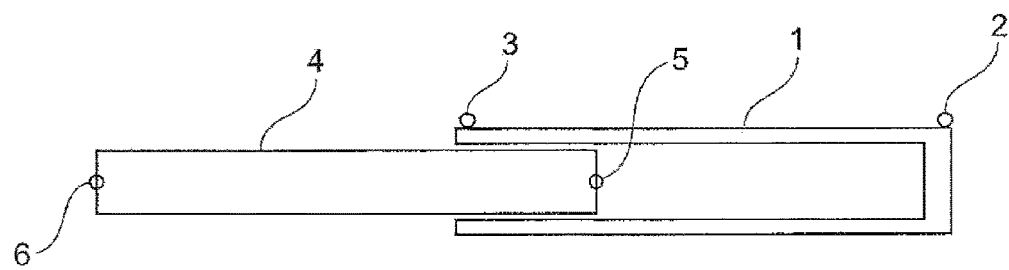

However, when the telescopic jib is in use as shown in FIG. 3, if it is the case that both jib sections 1 and 4 always have a constant and known overall length, it is not necessary to provide the detection point 3 on the jib section 1 and the infeed point 5 on the jib section 4. In this case it is sufficient that the first infeed point 2 is present on one jib section 1 and the second infeed point 6 is present on the further jib section 4, in order to determine the overall length of these jib sections 1 and 4 that varies on the basis of the telescoping. The same principle is of course applicable if more than two jib sections 1 and 4 can be moved (telescopically) relative to one another. In a such case it is sufficient if for example the infeed point 2 is present on the jib element located on the base of the crane and the second infeed point 6 is present on the last jib element facing away from the first. Then the overall length of the telescopic jib can be determined by elapsed-time measurement between these two infeed and detecting points.

In order to carry out the method described above, apparatus is provided for wear-free determination of an overall length of a jib of a crane, and the apparatus has means for feeding in a signal at first points 2 and 5 on the jib sections 1 and 4 and means for detecting at second points 3 and 6 on the jib sections 1 and 4. Further means are provided by which the overall length GL is determined from the time required for the signal to pass from the first point 2, 5 to the second point 3, 6.

The invention claimed is:

1. A method of wear-free determination of an overall length of a jib of a crane, the method comprising the steps of:
   feeding a signal into the jib at a first point on the jib;
   detecting the signal at a second point on the jib; and
   determining the overall length of the jib from the time required for the signal to pass from the first point to the second point.

2. The method according to claim 1, wherein the signals are fed in or out detected at the end faces of the jib.

3. The method according to claim 1, wherein at least one signal is fed in or detected at a spacing from an end face of the jib, the method further comprising the step of:
   determining the overall length by taking into consideration the spacing between the end and the infeed point.

4. The method according to claim 1, wherein the jib is a telescopic jib having a plurality of jib sections and the overall length is determined from the individual lengths of the jib sections.

5. The method according to claim 1, wherein the determination of the overall length is carried out before each use of the crane.

6. The method according to claim 1, wherein the determination of the overall length is carried out at a chronologically predetermined interval after each use of the crane.

* * * * *